(12) United States Patent
Suzuki

(10) Patent No.: US 6,738,167 B1
(45) Date of Patent: May 18, 2004

(54) IMAGE READING APPARATUS AND DOCUMENT FEEDING METHOD IN IMAGE READING APPARATUS

(75) Inventor: Kazuhiro Suzuki, Kanagawa-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 445 days.

(21) Appl. No.: 09/628,799

(22) Filed: Jul. 28, 2000

(51) Int. Cl.[7] .......................... H04N 1/04; G03G 15/00; B65H 3/44
(52) U.S. Cl. ................. 358/498; 358/496; 399/367; 399/369; 271/9.01
(58) Field of Search ................. 358/498, 496, 358/497, 401, 487, 501, 505, 506; 271/4.08, 3.05, 3.08, 3.19, 3.15, 9.09, 9.1, 9.06, 9.01; 399/367, 374, 369

(56) References Cited

U.S. PATENT DOCUMENTS

| | | | | |
|---|---|---|---|---|
| 5,761,599 A | * | 6/1998 | Weng et al. | ................. 399/367 |
| 5,823,522 A | * | 10/1998 | Fujiwara et al. | ........... 271/4.08 |
| 5,841,553 A | * | 11/1998 | Neukermans | ................ 358/494 |
| 5,887,866 A | * | 3/1999 | Yamauchi et al. | .......... 271/116 |
| 5,969,831 A | * | 10/1999 | Ichinose | ..................... 358/498 |
| 6,069,715 A | * | 5/2000 | Wang | ......................... 358/498 |
| 6,088,135 A | * | 7/2000 | Kusumoto | ................... 358/498 |
| 6,233,068 B1 | * | 5/2001 | Kondo | ........................ 358/498 |

FOREIGN PATENT DOCUMENTS

JP          11-035174          2/1999

* cited by examiner

Primary Examiner—Cheukfan Lee
(74) Attorney, Agent, or Firm—Foley & Lardner LLP

(57) ABSTRACT

The image reading apparatus according to the present invention includes a reading device which reads the images of documents fed into an image reading area, a first document feeding device which feeds first documents into the first image reading area of the reading device, and a document feeding unit which is detachably mounted on the first document feeding device and feeds second documents into the second image reading area of the reading device.

20 Claims, 8 Drawing Sheets

IMAGE READING APPARATUS AND DOCUMENT FEEDING METHOD IN IMAGE READING APPARATUS

BACKGROUND OF THE INVENTION

1. Field of the Invention

This invention relates to an image reading apparatus which reads a document automatically fed onto document glass and a method for feeding documents in the image reading apparatus.

2. Description of the Related Art

With an image reading scanner, a digital copying machine or the like provided with an automatic document feeding device, a special document, small in size and great in thickness, such as a business card, cannot be fed by an automatic document feeding device which is for feeding sheets of paper of ordinary paper size. To cope with this, conventionally, an operator must manually set business cards on document glass to read or copy the business cards or a separate scanner dedicated to reading business cards must be used to read business cards.

However, in the former case, it is a time-consuming job to arrange business cards on document glass, and this significantly impairs efficiency. If a scanner dedicated to reading business cards is used as in the latter case, reading accuracy is markedly degraded because such scanners are very low in reading speed and resolution, and further it is required to ensure a space for the dedicated scanner.

Therefore, image reading apparatuses have been demanded to be capable of feeding documents, even if they are special documents, small in size and great in thickness, with ease and efficiency, and reading the images of documents with high resolutions.

SUMMARY OF THE INVENTION

An object of the present invention is to make it possible to read special documents, such as business cards, at high speed and with high resolutions and ease, using an image reading apparatus provided with an automatic document feeding device, and to enhance the efficiency of reading special documents and the accuracy of read images.

A further object of the present invention is to make effective use of part of the automatic document feeding device of an image reading apparatus, and thereby save dedicated space which would be otherwise required for reading special documents, such as business cards.

According to the present invention, an image reading apparatus comprising a reading means which reads the images of documents fed into an image reading area, a first document feeding means which feeds a first document into the first image reading area of the reading means, and a second document feeding means which is detachably mounted on the first document feeding means and feeds a second document into the second image reading area of the reading means is provided.

Further, according to the present invention, an image reading apparatus comprising a reading device which reads the images of documents fed into an image reading area, a first document feeding device which feeds a first document into the first image reading area of the reading device, and a second document feeding unit which is detachably mounted on the first document feeding device and feeds a second document into the second image reading area of the reading device is provided.

Further, according to the present invention, a method for feeding documents in the image reading apparatus which method comprises feeding a first document from a first side into the first image reading area of the reading device, and feeding a second document from the side opposite the first side of the reading device into the second image reading area of the reading device is provided.

DETAILED DESCRIPTION OF THE PREFERRED EMBODIMENTS

Figure 1:
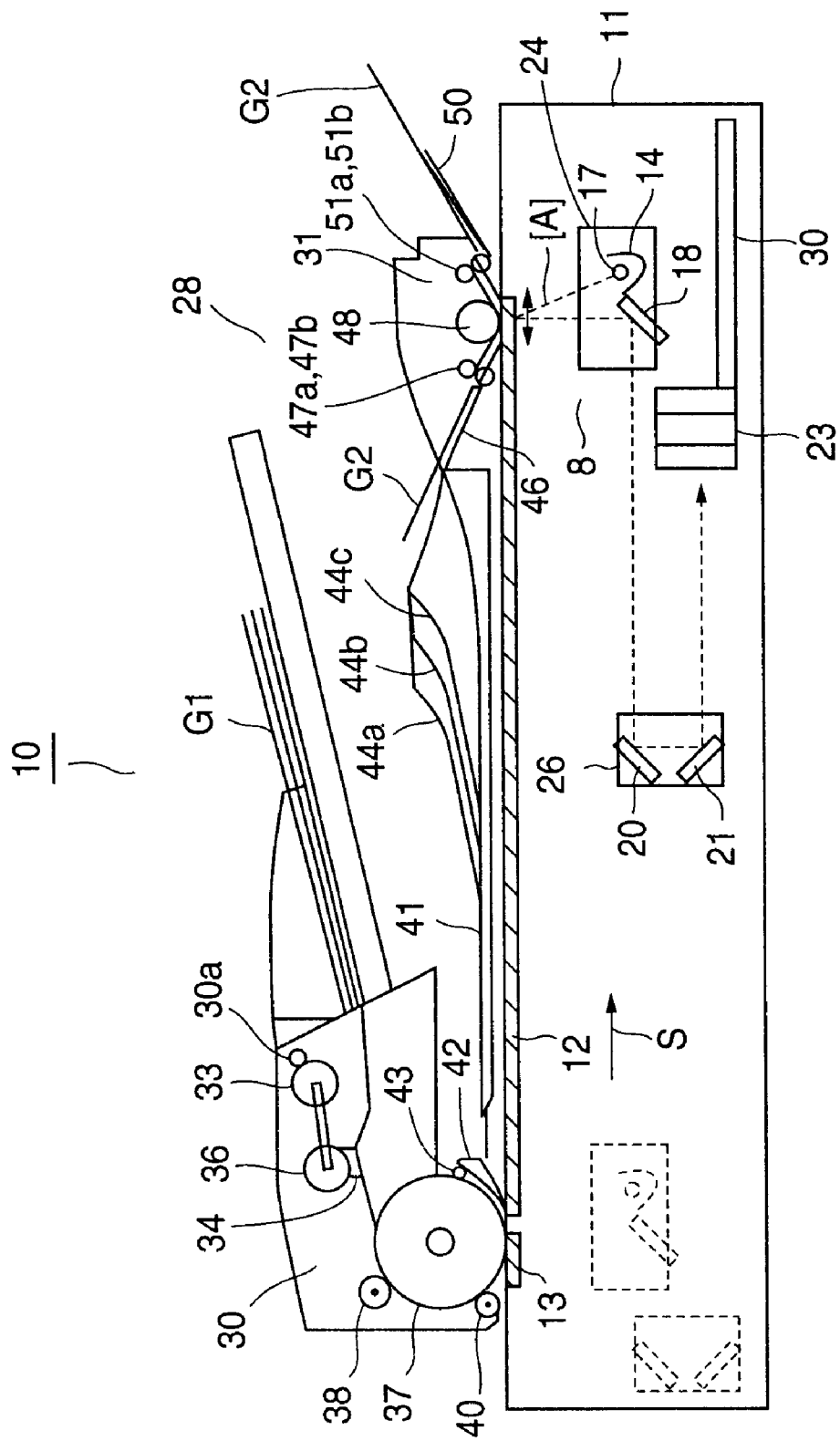
FIG. 1 is an illustration schematically showing the configuration of a scanner embodying the present invention.
Figure 2:
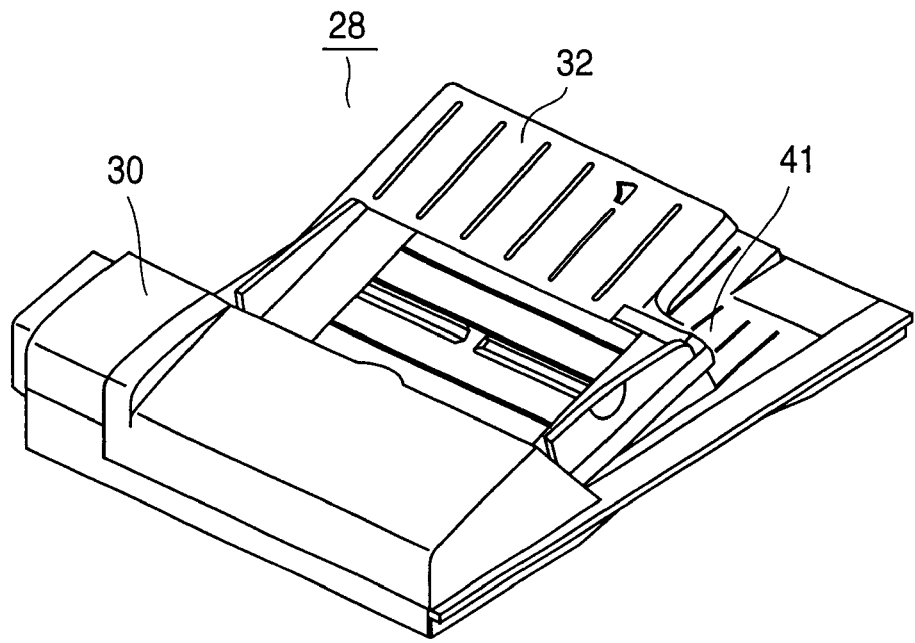
FIG. 2 is a schematic perspective view illustrating an automatic document feeding device embodying the present invention.
Figure 3:
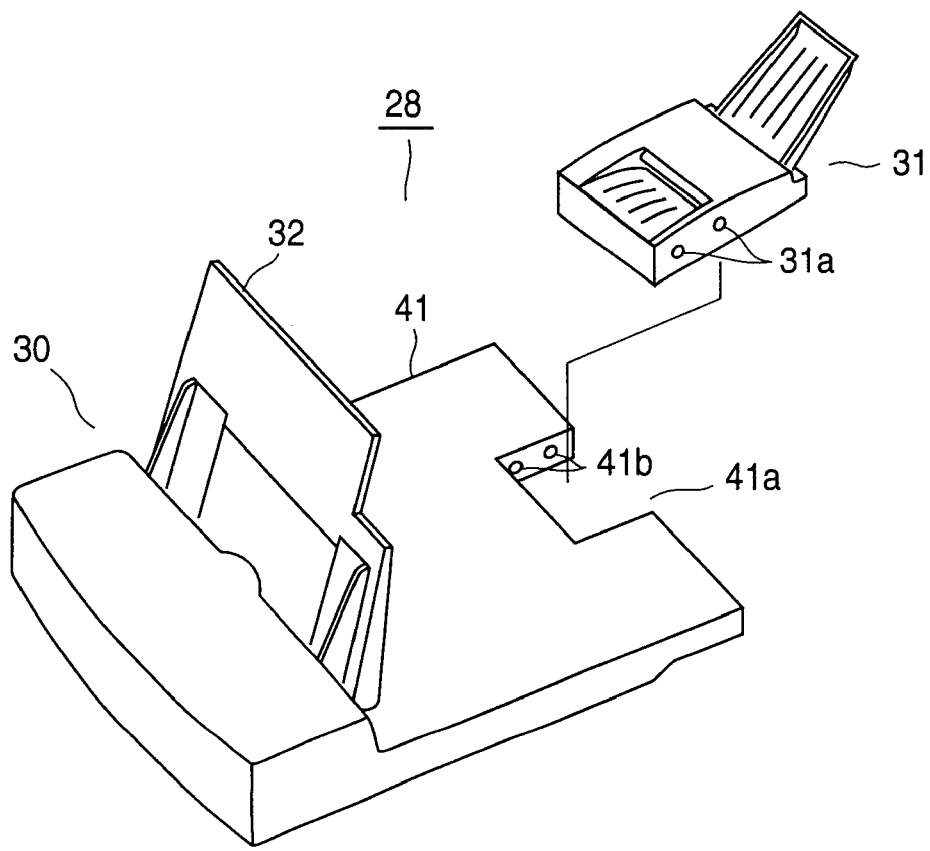
FIG. 3 is an exploded perspective view of a document feeding unit as mounted to the first document feeding device of the automatic document feeding device embodying the present invention.
Figure 4:
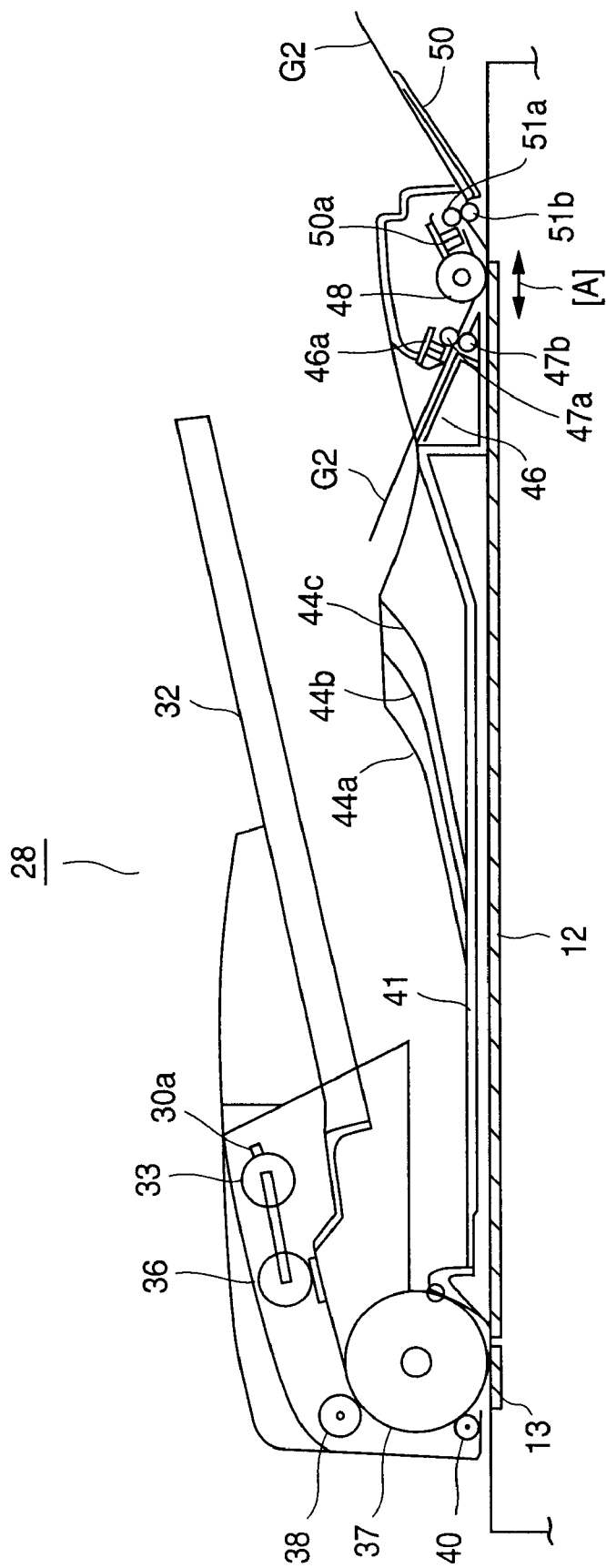
FIG. 4 is an illustration schematically showing the configuration of the automatic document feeding device embodying the present invention.
Figure 5:
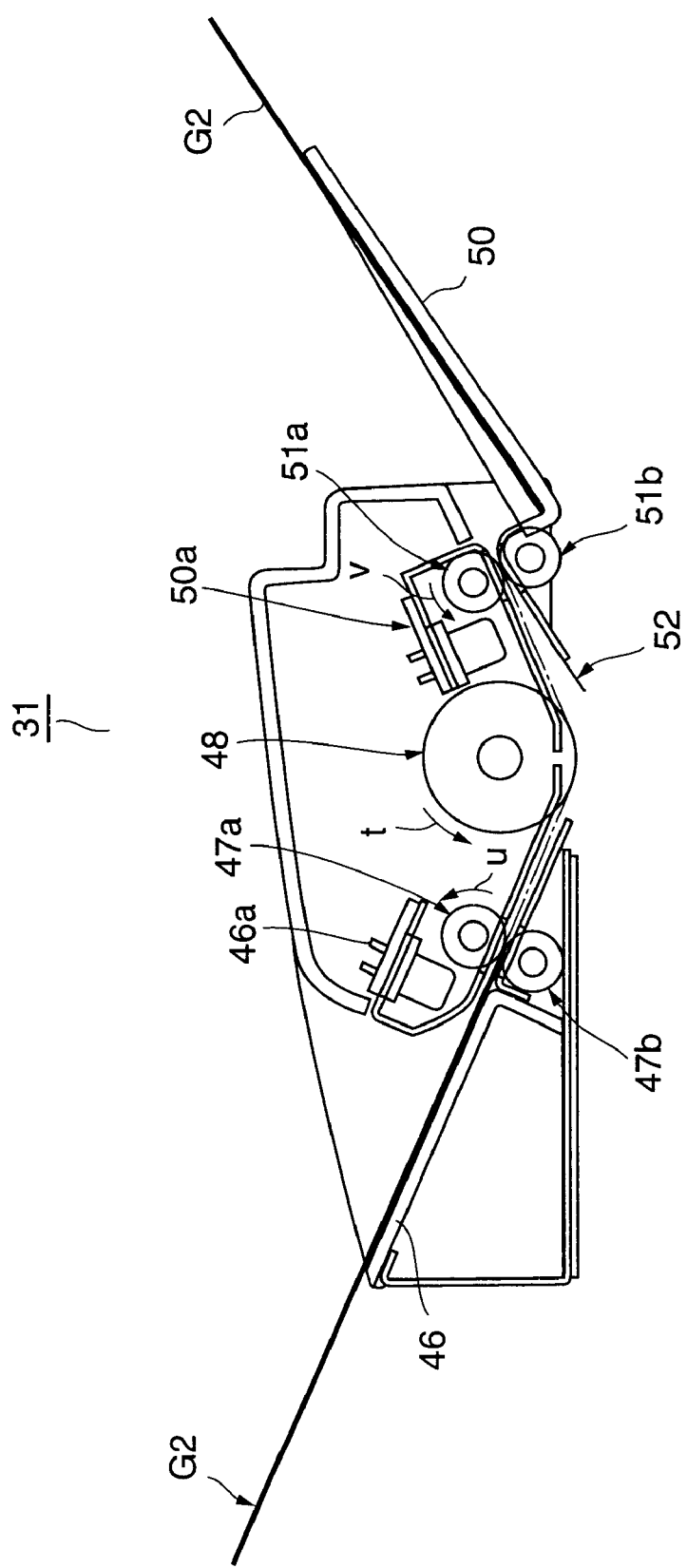
FIG. 5 is an illustration schematically showing the configuration of the document feeding unit embodying the present invention.
Figure 6:
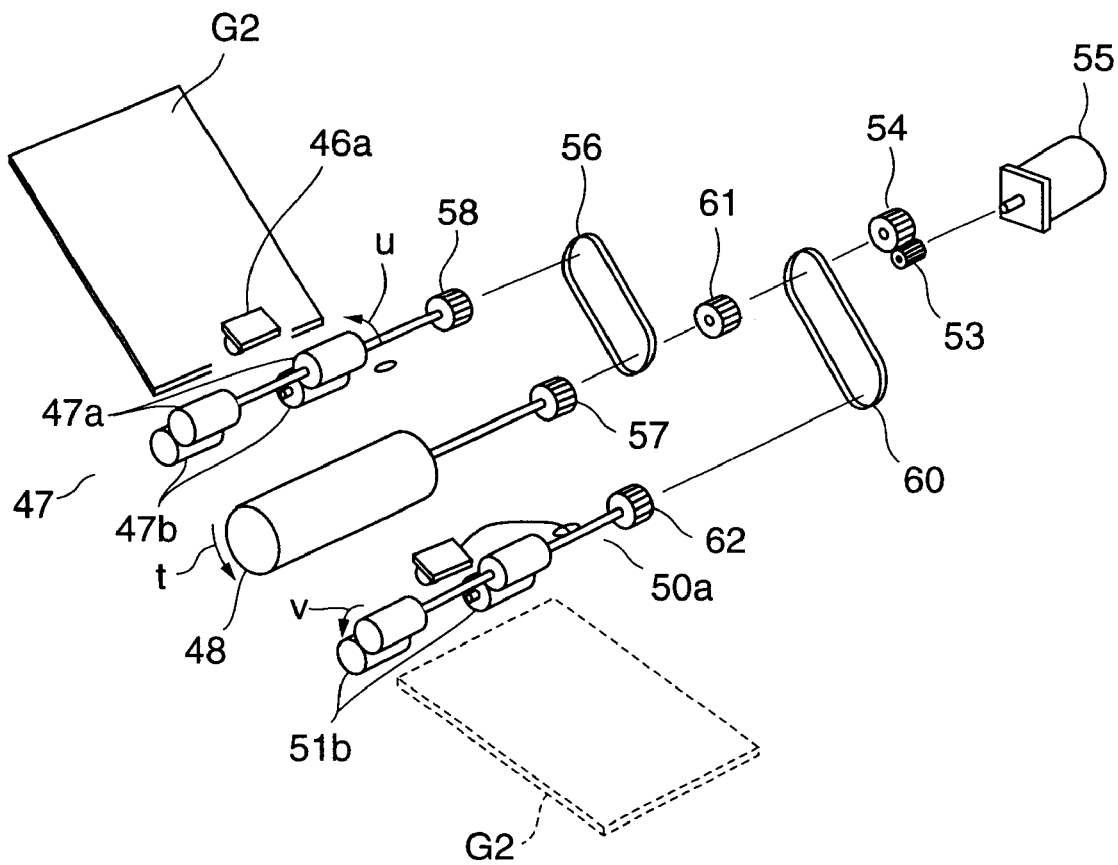
FIG. 6 is an exploded perspective view schematically showing the drive system of the document feeding unit embodying the present invention.

Referring to the attached drawings, preferred embodiments of the present invention are described below in details. FIG. 1 schematically illustrates the configuration of a scanner 10 which is an image reading apparatus embodying the present invention and is mounted with a CCD sensor 11. Document glass 12 made of a transparent glass plate and a reading window 13 made of a glass plate for reading documents fed by an automatic document feeding device 28 described below are formed above the CCD sensor 11.

Image reflected light from a document placed on the document glass 12 or a document passed on the reading window 13 is projected into the CCD sensor 11 by an optical system 8 comprising a lamp 17, first through third mirrors 18, 20, and 21, and a lens 23 wherein light is gathered onto a reflector 14. The reflector 14, the lamp 17 and the first mirror 18 are mounted on a first carriage 24, and the second and third mirrors 20 and 21 are mounted on a second carriage 26. The first carriage 24 and the second carriage 26 are driven by a drive pulley (not shown) controlled by a control board 30 and reciprocatory moved along rails not shown.

The through-read-type automatic document feeding device 28 which automatically feeds documents is installed on the document glass 12. The automatic document feeding device 28 comprises a first document feeding device 30 which feeds ordinary documents G1 of ordinary paper size, A4, B4 or the like, as first document, onto the reading window 13, and a document feeding unit 31 which is detachably mounted at the end of the document receiving tray 41 of the first document feeding device and feeds only business cards G2 as second document.

The first document feeding device 30 is provided with a pick-up roller 33 which takes out documents G1 on a document placement tray 32, a separating roller 36 which is in slidable contact with a separating member 34, first and second conveying rollers 37 and 38 which clamp documents G1 between them and convey them, and an aligning roller 40, and feeds ordinary documents G1 onto the reading window 13 formed in the first reading area. Further, the first document feeding device 30 is provided with a guide 42 and an ejecting roller 43 which guide an ordinary document G1 read through the reading window 13 toward the document receiving tray 41 using the first conveying roller 37. Items marked with numbers of 44a–44c are ribs which align ordinary documents G1, read and ejected onto the document receiving tray 41, on a size-by-size basis.

The document feeding unit 31 is detachably mounted at the end of the document receiving tray 41 of the first document feeding device 30 on the side opposite the first conveying roller 37 side, by fitting the elastic projection 31a on the document feeding unit 31 into the fitting hole 41b formed in the notch 41a in the document receiving tray 41. For the reason, the document placement tray 32 is rotatable on a fulcrum 30a so as not to interfere with the document feeding unit 31.

Then the document feeding unit 31 is described in details. The document feeding unit 31 is provided with an insertion tray 46 dedicated to business cards on which business cards G2 are to be placed, a paper supply sensor 46a which detects any business card G2 on the insertion tray 46 dedicated to business cards, a pair of upper and lower paper supply rollers 47a and 47b which feed business cards G2 on the insertion tray 46 dedicated to business cards into the business card reading area [A] as the second reading area on the document glass 12, a conveying roller 48 which conveys business cards G2 in the business card reading area [A], a scooping Mylar sheet 52 which scoops up business cards G2 and guides them toward a document receiving tray 50, a pair of upper and lower ejecting rollers 51a and 51b which eject business cards G2 onto the document receiving tray 50, and an ejection sensor 50a which detects business cards G2 conveyed by the conveying roller 48.

The item marked with "55" is a pulse motor which drives the conveying roller 48 through a gear wheel a 53 and a gear wheel b 54. The driving force from the pulse motor 55 is transmitted from a first pulley 57 to a second pulley 58 through a first timing belt 56 to drive the upper-paper supply roller 47a, and from a third pulley 61 to a fourth pulley 62 through a second timing belt 60 to drive the upper ejecting roller 51a.

Then the principle of operation is described in case ordinary documents G1 are fed onto the reading window 13 using the first document feeding device 30 and the documents are read, the documents G1 are placed on the document placement tray 32, and thereafter, a print key not shown is turned on to start reading operation. At this time the document feeding unit 31 may be left mounted on the document receiving tray 41. In ordinary cases, however, the document feeding unit 31 is dismounted so as not to interfere with ejection of ordinary documents G1.

When reading operation is started, the pick-up roller 33 is rotated to take ordinary documents G1 out of the document placement tray 32, and only the uppermost ordinary document G1 is conveyed toward the first and second conveying rollers 37 and 38 by the separating member 34 and the separating roller 36. Then the ordinary document G1 is conveyed by the first and second conveying rollers 37 and 38, and has its front end aligned by the aligning roller 40. In this state the ordinary document is fed onto the reading window 13. At this time the first and second carriages 24 and 26 are stopped in the position shown by a dotted line in FIG. 1 so as to read an image through the reading window 13 located in the first reading area.

When the ordinary documents G1 are conveyed by the first and second conveying rollers 37 and 38 and passed on the reading window 13 one by one, in the optical system the lamp 17 is turned on, and the ordinary documents G1 are irradiated with light through the reading window 13. Light from the lamp 17, reflected from the ordinary document G1, is projected into the CCD sensor 11 through the first through third mirrors 18, 20, and 21 and the lens 23, and the image of the ordinary document G1 is formed there. Thus the ordinary documents G1 are read one by one, and the image information of the ordinary documents G1 is stored in a storage device not shown. Thereafter, the ordinary documents G1 passed on the reading window 13 are guided toward the ejecting roller 43 by the guide 42, and ejected onto the document receiving tray 41 by the ejecting roller 43, thus the image reading operation being completed.

In case an ordinary document G1 is manually fed by an operator, the automatic document feeding device 28 is opened, and the ordinary document G1 is placed on the document glass 12. Thereafter, the print key is turned on to start reading operation. Then the lamp 17 is turned on, and the first second carriages 24 and 26 in their home positions are scanned in the direction of the arrow s. While this is being done, light from the lamp 17 reflected from the ordinary document G1 is projected into the CCD sensor 11 through the first through third mirrors 13, 20, and 21 and the lens 23, and the image of the document G1 is formed there. Thus the ordinary documents G1 are read one by one, and the image information of the ordinary documents G1 is stored in a storage device not shown.

Figure 7:
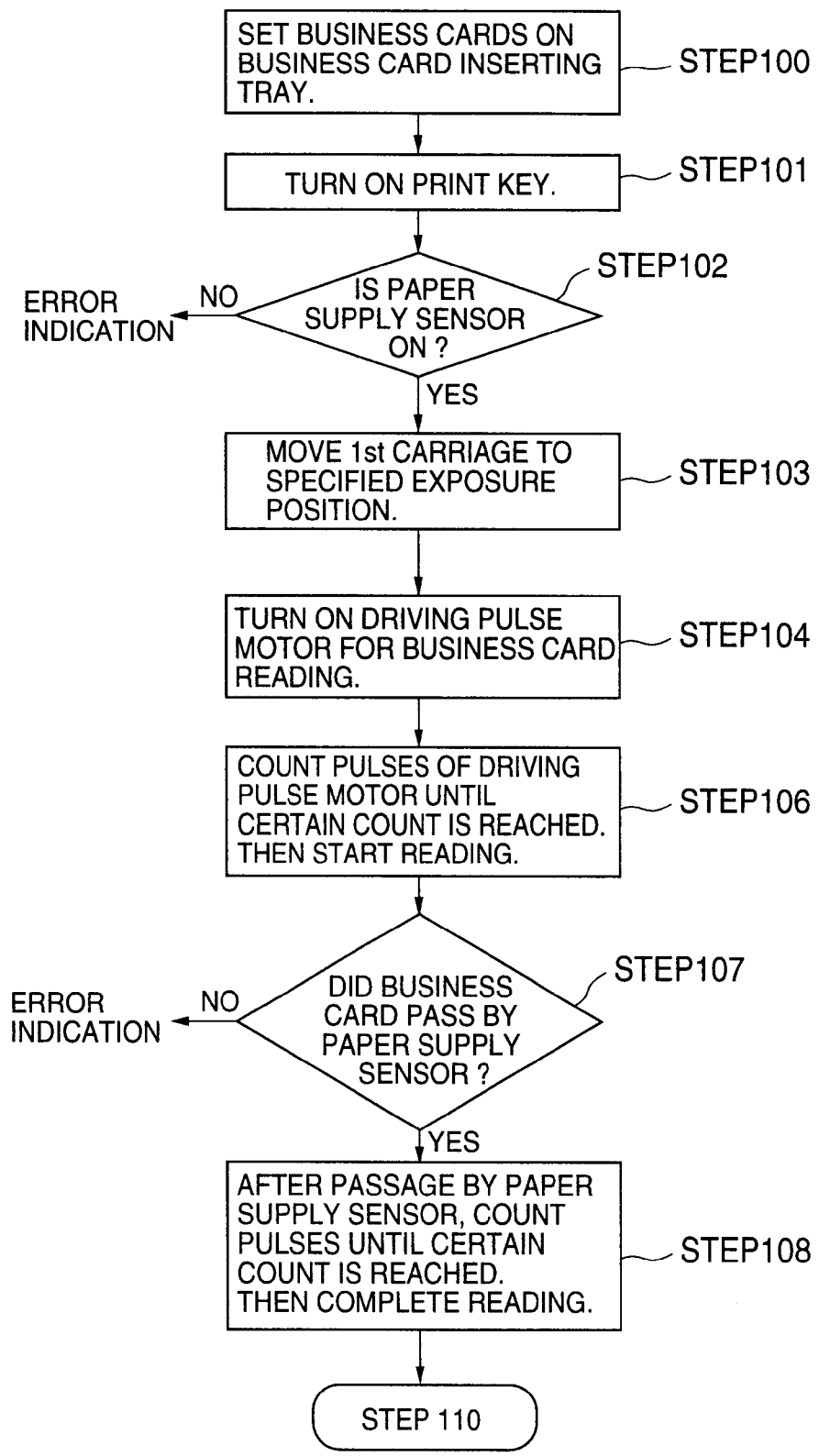
FIG. 7 is a flowchart illustrating part of business card document reading operation by the document feeding unit embodying the present invention.
Figure 8:
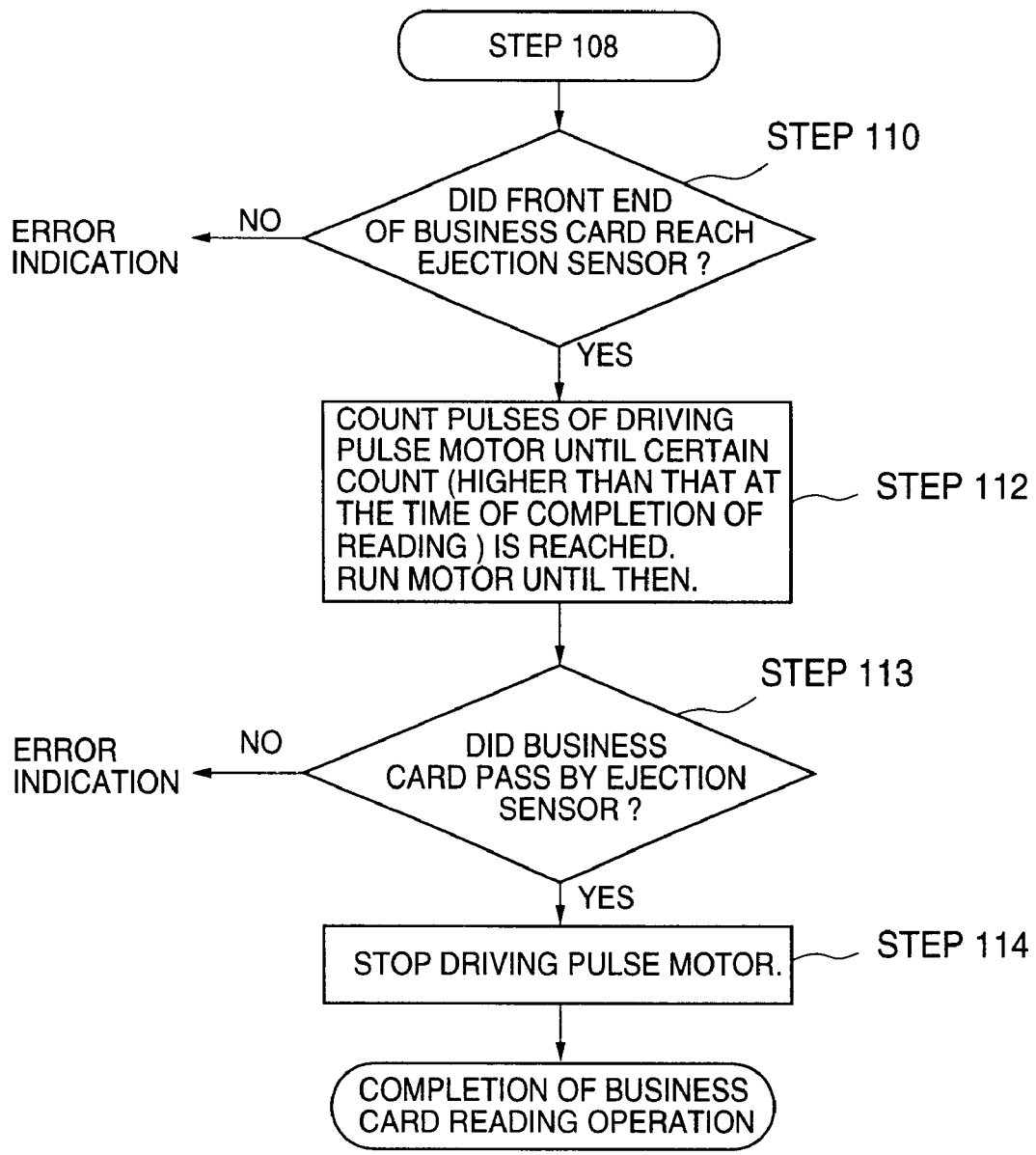
FIG. 8 is a flowchart illustrating part subsequent to FIG. 7 of business card document reading operation by the document feeding unit embodying the present invention.

Then cases where business cards G2 are fed into the business card reading area [A] using the document feeding unit 31 and read there are described below referring to the flowcharts in FIG. 7 and FIG. 8. To read business cards G2, first, the projection 31a on the document feeding unit 31 is fit into the fitting hole 41b in the document receiving tray 41 to mount the document feeding unit 31 on the document receiving tray 41.

Then, business cards G2 are set on the insertion tray 46 dedicated to business cards in Step 100, and thereafter, the print key not shown is turned on to start operation of reading the business cards G2 in Step 101. The operation proceeds to Step 102, and comparison is made to judge whether the paper supply sensor 46a is turned on or not. If there is no business card G2 set on the insertion tray 46 dedicated to business cards and the paper supply sensor 46a is not turned on in Step 102, an error indication is given on a display panel not shown. When the paper supply sensor 46a is found on in Step 102, the operation proceeds to Step 103.

In Step 103, the first and second carriages 24 and 26 in their home positions are slid to the position indicated by a solid line in FIG. 1 in the direction of the arrow s so that image reading may be performed in the business card reading area [A], and then the operation proceeds to Step 104. In Step 104, the pulse motor 55 is turned on, and then the operation proceeds to Step 106. In Step 106 the pulses of the pulse motor 55 are counted until a certain count is reached, and then operation of reading the business cards G2 is started.

That is, the conveying roller 48 is rotated in the direction of the arrow t through the gear wheel a 53 and the gear wheel b 54, and further, the upper paper supply roller 47a is rotated in the direction of the arrow u and the upper ejecting roller 51a is rotated in the direction of the arrow v to feed business cards G2 toward the conveying roller 48 by the paper supply rollers 47a and 47b. Then the business cards G2 are conveyed by the conveying roller 48 and passed through the business card reading area [A] one-by one.

While this is being done, in the optical system the lamp 17 is turned on, and the business card G2 is irradiated with light in the business card reading area [A]. Light from the lamp 17 reflected from the business card G2 is projected into the CCD sensor 11 through the first through third mirrors 18, 20, and 21 and the lens 23, and the image of the business card G2 is formed there. The business cards G2 are read one by one, and the image information of the business cards G2 is stored in the storage device not shown. Thereafter, the business cards G2 passed through the business card reading area [A] are guided toward the ejecting rollers 51a and 51b by the scooping Mylar sheet 52, and ejected onto the document receiving tray 50 by the ejecting rollers 51a and 51b.

When the paper supply sensor 46a detects the passage of a business card G2 in Step 107 while this is being done, the operation proceeds to Step 108. If the passage of a business card G2 is not detected for a specified period of time in Step 107, that is judged as a paper jam, and an error indication is given on the display panel. In Step 108, after the passage of a business card G2 by the paper supply sensor 46a, the pulses of the pulse motor 55 are counted until a certain count is reached. Then the first and second carriages 24 and 26 are returned from the business card reading area [A] to their home positions to prepare for the completion of reading operation, and the operation proceeds to Step 110.

In Step 110 comparison is made to judge whether the front end of the business card G2 has reached the ejection sensor 50a or not. If the front end of the business card G2 has not reached, an error indication is given on the display panel. When it is found that the front end of the business card G2 has reached the ejection sensor 50a, the operation proceeds to Step 112.

In Step 112 the pulse motor 55 is run, and then the operation proceeds to Step 113. In Step 113 comparison is made to judge whether the tail end of the business card G2 has passed by the ejection sensor 50a or not. If the tail end of the business card G2 has not passed, an error indication is given on the display panel. If it is judged that the tail end of the business card G2 has passed by the ejection sensor 50a, the operation proceeds to Step 114, in which the pulse motor 55 is stopped, and the operation of reading the business card G2 is completed. After the completion of business card G2 reading operation, the document feeding unit 31 is removed from the document receiving tray 41.

According to this constitution, business cards G2 can be easily read without damage to the business cards G2 by detachably mounting the document feeding unit 31 dedicated to business cards G2 at the end of the document receiving tray 41 in the first document feeding device 30, feeding the business cards G2 into the business card reading area [A] of the CCD sensor 11 by means of the document feeding unit 31, and then reading images there. With this constitution, it is unnecessary for an operator to place business cards G2 on the document glass as in conventional cases or to use a reading device dedicated to reading of business cards G2. Further, the first document feeding device 30 conveys ordinary documents G1 only on the conveying roller 37 side of the document receiving tray 41, and the document feeding unit 31 uses the side of the document receiving tray 41 which has no influence on the conveyance of ordinary documents G1. Therefore, there is not a possibility that thee conveyance of ordinary documents G1 is interfered with.

As a result, business cards G2 can be read with ease using a high-speed scanner 10, and higher document resolutions are obtained. Furthermore, part of the document receiving tray 41 of the first document feeding device 30 can be effectively utilized without interfering with ordinary document G1 discharging operation, and space for installation can be saved.

It is to be understood that the present invention is not limited to the above-mentioned embodiments and changes and variations may be made without departing from the sprint or scope of the following claims. For example, the construction and the like of the first document feeding device are optional as long as first documents of ordinary size and the like can be fed and ejected on its one side, and those which automatically flips over documents with print on both their sides and feeds them may be adopted. As for the document feeding unit, those which are provided with a document separating mechanism at their paper supply unit and continuously feed second documents, such as business cards, may be used as well as those which feed documents one by one, and second documents may be post cards and the like.

Figure 9:
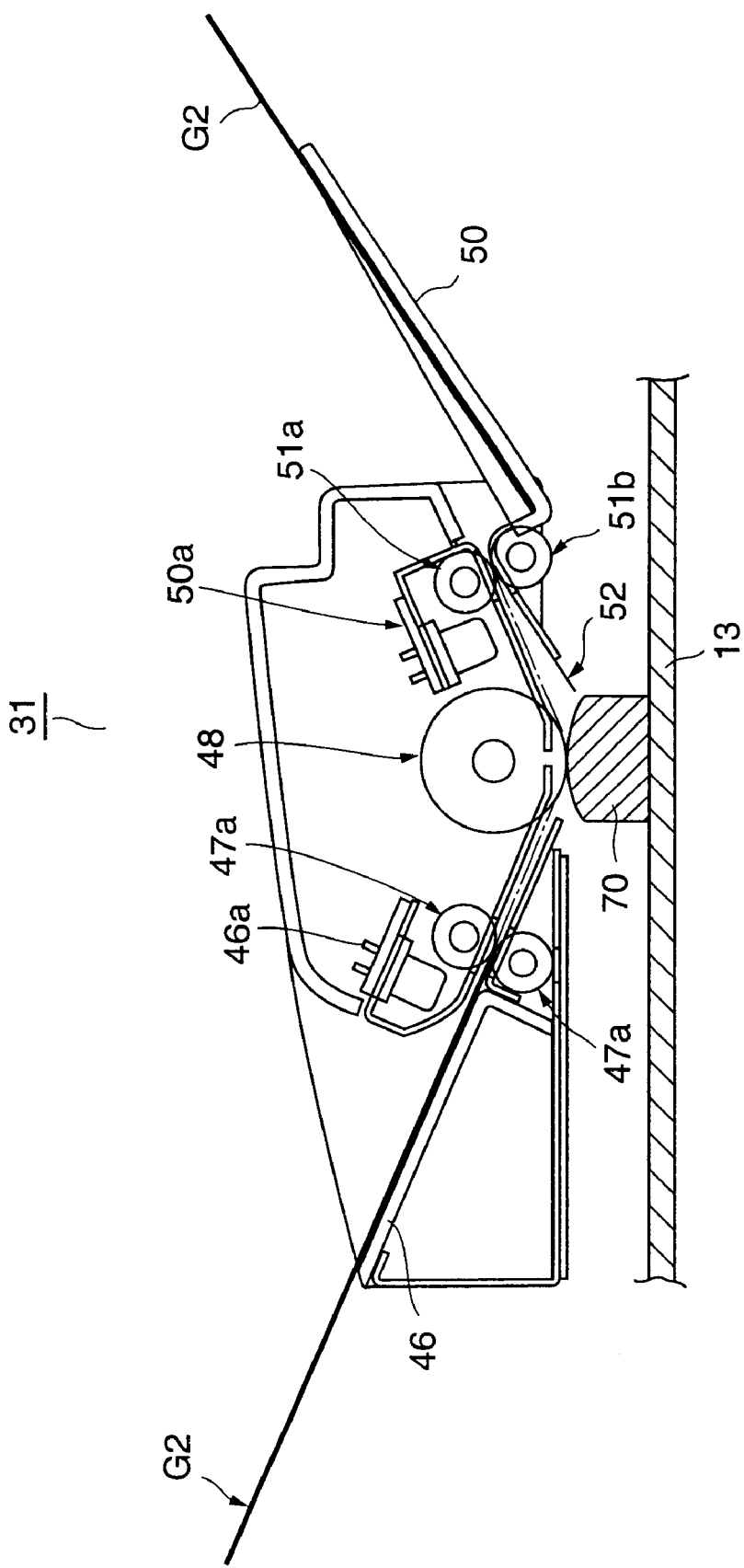
FIG. 9 is a schematic illustration showing feeding of business cards by a document feeding unit, an example of modification to the present invention.

Further, like an example of modification illustrated in FIG. 9, a lens 70 may be placed in a position opposite the conveying roller 48 on the document feeding unit 31 in the above-mentioned embodiments so that business cards G2 may be provided to the business card reading area [A] on the document glass 12 through the lens 70. Thus the curve of the path in which business cards G2 are fed by the document feeding unit 31 can be made more gentle, and deformation in business cards G2 which may occur when they are passed through the document feeding unit 31 can be further reduced.

In addition there is not any restriction on methods for processing image data acquired by means of the image reading apparatus, and such image data may be treated in any way. Image data may be managed as sets of data by storing it in fixed sizes or the like, or stored data may drawn and used over a network, or image data may be converted into text data or numerical data for the purpose of data cataloging.

As described above in details, according to the present invention, business cards and the like can be easily read with higher resolutions using a through-read-type image reading apparatus by detachably mounting the document feeding unit for feeding only specific documents, such as business cards, on the first document feeding device on the side opposite the document supply side, and feeding specific documents which cannot be fed by the first document feeding device without interfering with document supplying operation by the first document feeding device. Further, it is unnecessary to ensure space specially for the installation of a document feeding unit, and space for installation can be saved.

What is claimed is:

1. An image reading apparatus comprising:

reading means for reading images of documents fed into an image reading area;

first document feeding means for feeding first documents into a first image reading area of said reading means; and second document feeding means for being detachably mounted on said first document feeding means and feeding second documents into a second image reading area of said reading means.

2. An image reading apparatus as claimed in claim 1, wherein said reading means reads said first documents one by one when said first documents are passed through said first image reading area, or reads said second documents one by one when said second documents are passed through said second image reading area.

3. An image reading apparatus as claimed in claim 1, wherein said first document feeding means feeds said first documents into said first image reading area on a first side, and further ejects said first documents from said first image reading area on the same side as said first side, and said second document feeding means is detachably mounted on said first document feeding means on a side opposite to said first side.

4. An image reading apparatus as claimed in claim 1, wherein said second documents fed by said second document feeding means are of a single kind.

5. An image reading apparatus as claimed in claim 1, wherein said second documents are smaller in size than said first documents.

6. An image reading apparatus as claimed in claim 1, wherein said second documents are business cards.

7. An image reading apparatus as claimed in claim 1, wherein said second document feeding means is so arranged that a document feeding means and a document ejecting means are opposed to each other with said second document reading area in-between.

8. An image reading apparatus as claimed in claim 1 wherein said second document feeding means is further provided with an optical means between it and said second document reading area.

9. An image reading apparatus comprising:

a reading device that reads images of documents fed into a reading area;

a first document feeding device that feeds first documents into a first image reading area of said reading device; and a document feeding unit detachably mounted on said first document feeding device to feed second documents into a second image reading area of said reading device.

10. An image reading apparatus as claimed in claim 9 wherein said reading device reads said first documents one by one when said first documents are passed through said first image reading area, or reads said second documents one by one when said second documents are passed through said second image reading area.

11. An image reading apparatus as claimed in claim 9 wherein said first document feeding device feeds said first documents into said first image reading area on a first side and further ejects said first documents from said first image reading area on the same side as said first side, and said document feeding unit is detachably mounted on said first document feeding device on a side opposite to said first side.

12. An image reading apparatus as claimed in claim 9 wherein said second documents fed by said document feeding unit are of single kind.

13. An image reading apparatus as claimed in claim 9 wherein said second documents are smaller in size than said first documents.

14. An image reading apparatus as claimed in claim 9 wherein said second documents are business cards.

15. An image reading apparatus as claimed in claim 9 wherein said document feeding unit is so arranged that an insertion tray and a receiving tray are opposed to each other with said second document reading area in-between.

16. An image reading apparatus as claimed in claim 9 wherein said document feeding unit is further provided with an optical lens between it and said second document reading area.

17. A method for feeding documents in an image reading apparatus, the method comprising:

feeding first documents from a first side to a first image reading area of a reading device; and feeding second documents from a side opposite to said first side of said reading device to a second image reading area of said reading device, wherein said second image reading area is different from said first image reading area.

18. A method for feeding documents in the image reading apparatus as claimed in claim 17 wherein said first documents fed into said first image reading area are ejected from said first image reading area on said first side.

19. A method for feeding documents in the image reading apparatus as claimed in claim 17 wherein said first documents are fed into said first image reading area by a first document feeding device, and said second documents are fed into said second image reading area by a document feeding unit detachably mounted at part of said first document feeding device.

20. A method for feeding documents in the image reading apparatus as claimed in claim 17 wherein said second documents are business card documents.

* * * * *